(12) United States Patent
Rao et al.

(10) Patent No.: US 8,982,775 B2
(45) Date of Patent: Mar. 17, 2015

(54) GMPLS SIGNALING FOR NETWORKS HAVING MULTIPLE MULTIPLEXING LEVELS

(75) Inventors: Rajan Rao, Cupertino, CA (US); Khuzema Pithewan, Bangalore (IN); Ashok Kunjidhapatham, Bangalore (IN); Biao Lu, Saratoga, CA (US); Mohit Misra, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 777 days.

(21) Appl. No.: 12/977,696

(22) Filed: Dec. 23, 2010

(65) Prior Publication Data

US 2012/0106956 A1  May 3, 2012

Related U.S. Application Data

(60) Provisional application No. 61/409,245, filed on Nov. 2, 2010.

(51) Int. Cl.
| | |
|---|---|
| *H04B 7/212* | (2006.01) |
| *H04J 3/16* | (2006.01) |
| *H04J 3/12* | (2006.01) |
| *H04L 12/723* | (2013.01) |
| *H04J 3/14* | (2006.01) |

(52) U.S. Cl.
CPC .............. *H04J 3/1652* (2013.01); *H04J 3/12* (2013.01); *H04L 45/50* (2013.01); *H04J 3/14* (2013.01); *H04J 2203/006* (2013.01); *H04J 2203/0089* (2013.01)

USPC ............................ 370/321; 370/351; 370/442

(58) Field of Classification Search
CPC ............ H04J 3/1652; H04J 2203/0089; H04L 2012/5672; H04L 49/20

See application file for complete search history.

(56) References Cited

U.S. PATENT DOCUMENTS

| | | | |
|---|---|---|---|
| 2007/0248121 A1* | 10/2007 | Zou ................................ | 370/498 |
| 2010/0034205 A1* | 2/2010 | Kusama et al. ................ | 370/400 |

OTHER PUBLICATIONS

Zhang, Fatai; "Generalized Multi-Protocol Label Switching (GMPLS) Signaling Extensions for the evolving G.709 Optical Transport Networks Control"; Jul. 5, 2009, pp. 1-14.*

Papadimitriou, D., "Generalized Multi-Protocol Label Switching ( GMPLS) Signaling Extensions for G.709 Optical Transport Networks Control", RFC 4328, Jan. 2006, pp. 1-22.*

* cited by examiner

*Primary Examiner* — Redentor Pasia
*Assistant Examiner* — Salvador E Rivas
(74) *Attorney, Agent, or Firm* — Dunlap Codding PC; David L. Soltz

(57) ABSTRACT

A method comprising the steps of receiving, with circuitry at a first node, a signal indicative of a request to set up an optical channel data unit label switched path between the first node and a second node in a network. Time slots for a plurality of types of signals to be transmitted from the first node to the second node are reserved, and a set up message is transmitted from the first node to the second node. The set up message identifies the plurality of signal types and the reserved time slots. The optical channel data unit label switched path is then provided between the first and second nodes.

12 Claims, 8 Drawing Sheets

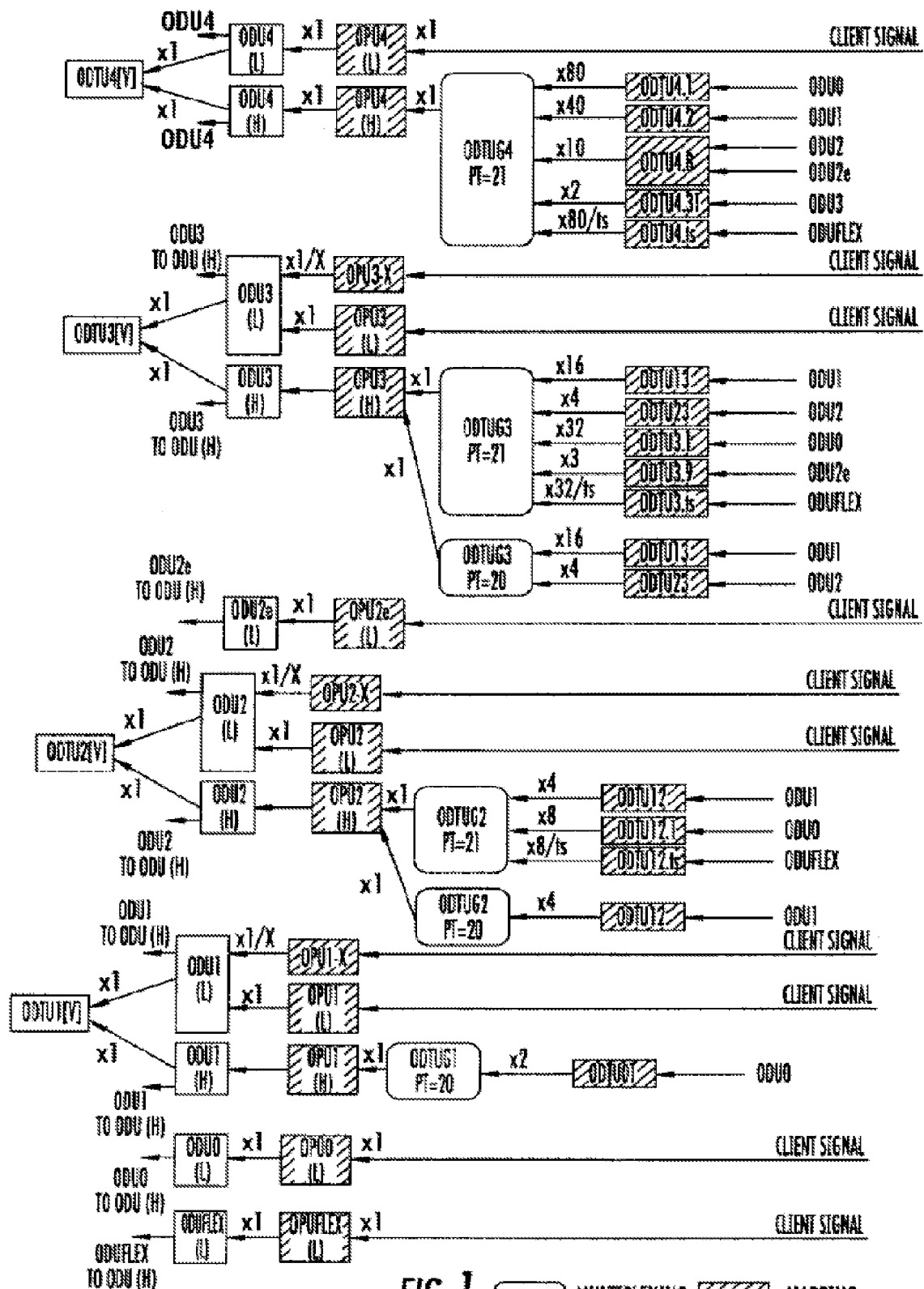
Prior Art FIG. 1

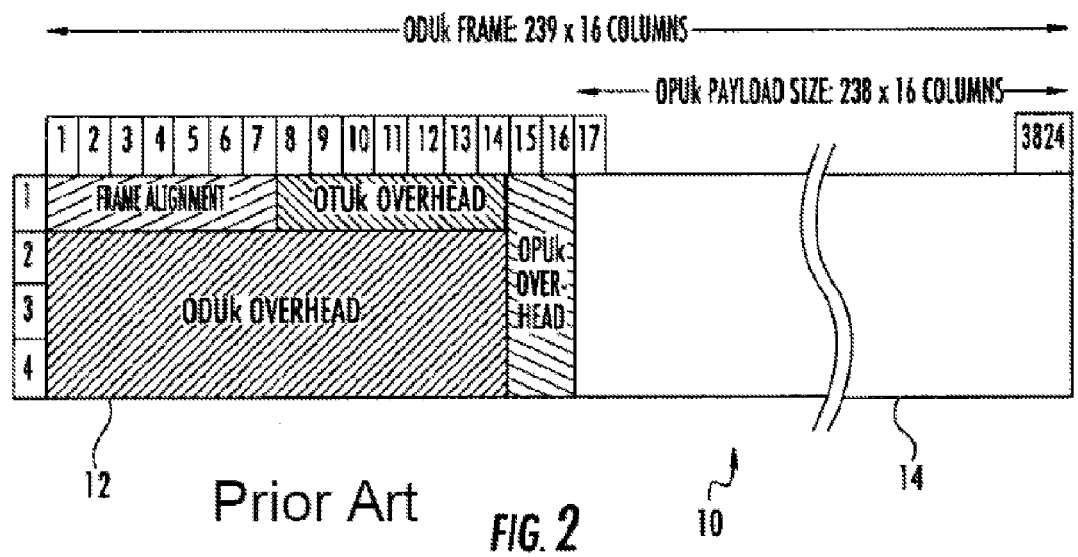
Prior Art FIG. 2
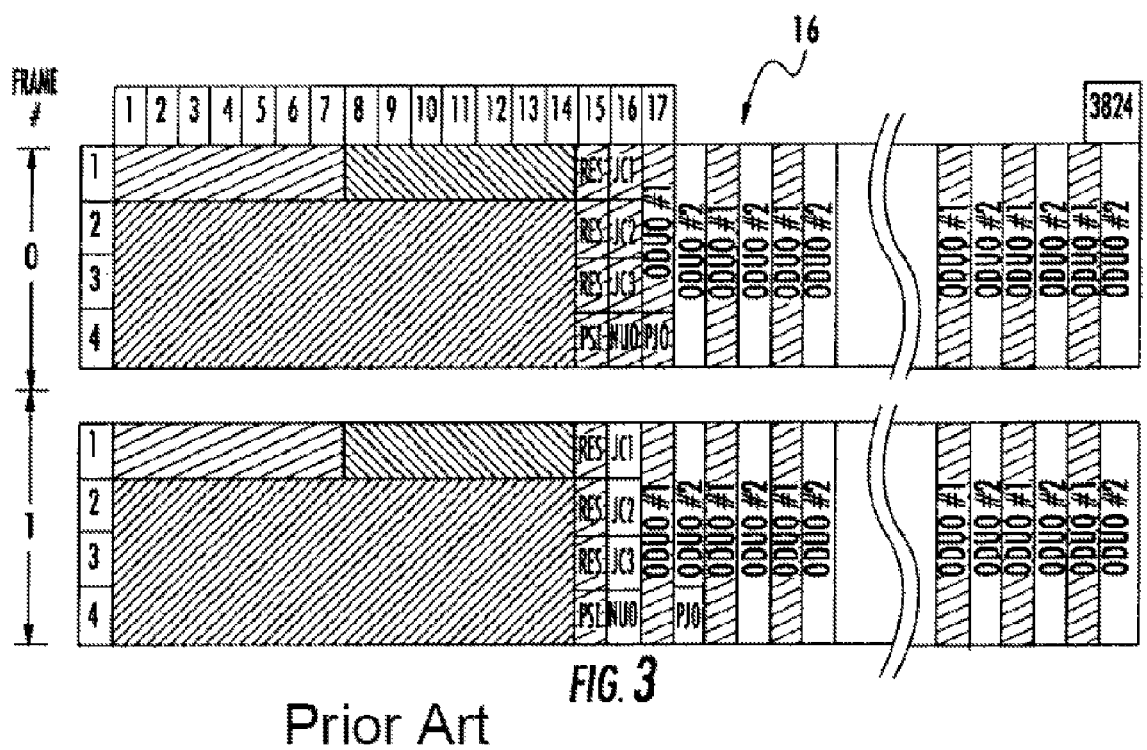
Prior Art FIG. 3

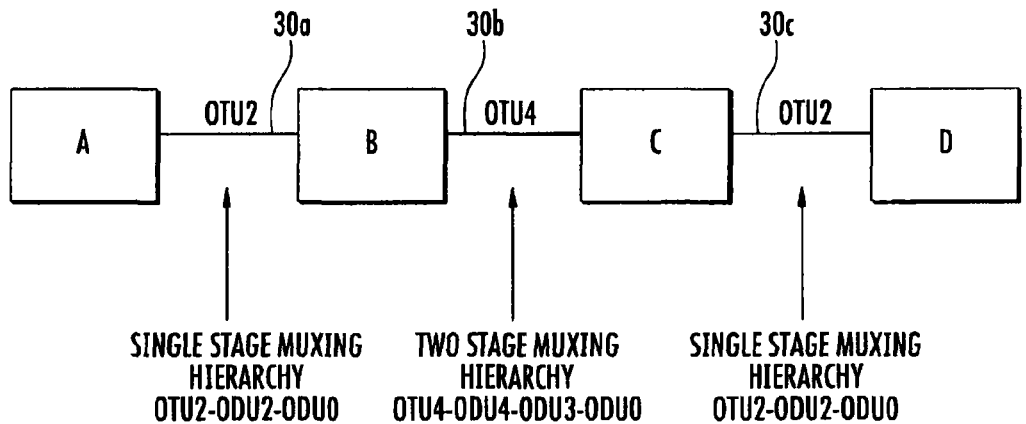
*FIG. 7*
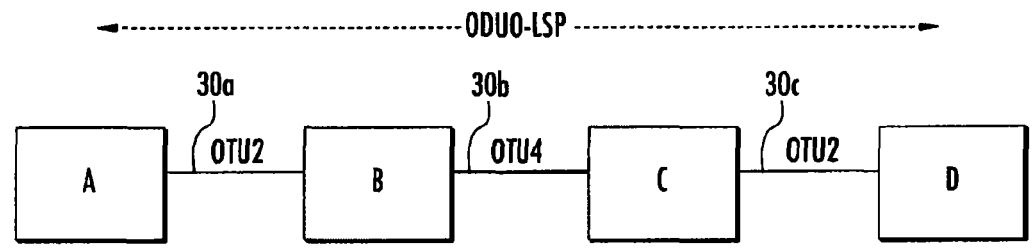
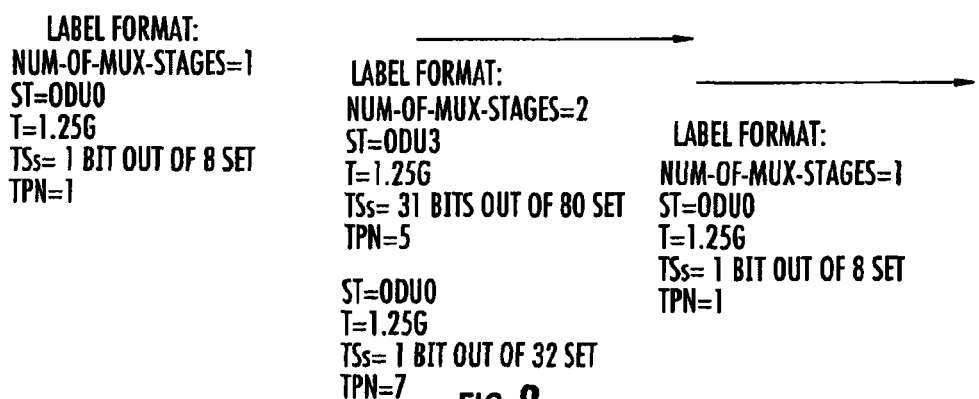
*FIG. 8*
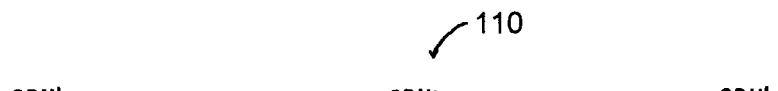
*FIG. 9*

GMPLS SIGNALING FOR NETWORKS HAVING MULTIPLE MULTIPLEXING LEVELS

FIELD OF THE DISCLOSURE

This application claims the benefit of U.S. Provisional Application No. 61/409,245 filed Nov. 2, 2010, the contents of which are incorporated herein by reference.

The disclosure generally relates to methods and apparatuses for setting up optical channel data unit label switched paths in networks having multiple nodes communicating via communication links. The optical channel data unit label switched paths are commonly referred to in the art as working connections, unprotected connections and protecting connections. The disclosure enables operators of the nodes to set up an optical channel data unit label switched path with time slots reserved for multiple types of signals within a multiplexing hierarchy of signals. This reduces the number of traffic engineered links within the network, as well as the number of optical channel data unit label switched paths within the network by reducing and/or eliminating hierarchical label switched paths at lower multiplexing levels before creation of the optical channel data unit label switched path. Multiple working connections and protecting connections may share the same set of network resources for optimal resource utilization. Though the methodologies set forth herein are in the context of an Optical Transport Network (OTN), such methodologies may apply to all transport networks that utilize a multiplexing hierarchy of signals.

BACKGROUND

Multiprotocol label switching (MPLS) is a scheme in high-performance telecommunication networks which directs and carries data from one node to the next node. The multiprotocol label switching mechanism assigns labels to data packets. Packet forwarding decisions from one node to the next node are made solely on the contents of the label for each data packet, without the need to examine the data packet itself.

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial multiplexing (e.g. incoming port or fiber to outgoing port or fiber). Multiplexing, such as time-division multiplexing is when 2 or more signals or bit streams are transferred simultaneously. In particular, time-division multiplexing (TDM) is a type of digital multiplexing in which 2 or more signals or bit streams are transferred simultaneously as sub-channels in one communication channel, but are physically taking turns on the communication channel. The time domain is divided into several recurrent timeslots of fixed length, one for each sub-channel. After the last sub-channel, the cycle starts all over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and preallocated to the channels, rather than scheduled on a packet by packet basis.

The optical transport hierarchy (OTH) supports the operation and management aspects of optical networks of various architectures, e.g., point-to-point, ring and mesh architectures. One part of the optical transport hierarchy is a multiplex hierarchy, which is a hierarchy consisting of an ordered repetition of tandem digital multiplexers that produce signals of successively higher data rates at each level of the hierarchy. Shown in FIG. 1 is an exemplary multiplexing hierarchy specified by way of optical channel data units, i.e., ODUj, where j varies from 0 to 4; and optical channel transport units, i.e., OTUk, where k varies from 1 to 4. The optical channel data units refer to a frame format for transmitting data which can be either fixed in the amount of data and data rate or variable in the amount of data and/or data rate.

Examples of optical channel data units that are fixed in the amount of data and data rate include those specified by ODU0, ODU1, ODU2, ODU3, and ODU4. An example of an optical channel data unit that is variable in the amount of data and/or data rate is referred to in the art as ODUflex One of the properties of the multiplexing hierarchy is that while the data rate changes over the different levels in the multiplexing hierarchy, the frame format remains identical. An ODU0 frame format 10 shown in FIG. 2. Like all other ODUjs, the ODU0 frame format 10 consists of a structure of four rows and 3824 columns, as presented in FIG. 2. The ODU0 frame format 10 is further divided into an ODUk overhead area 12 (the first fourteen columns) and an optical channel payload unit (OPU) area 14. The optical channel payload unit area 14 contains two columns of overhead and 3808 columns of payload area which is available for the mapping of client data.

The nominal ODU0 rate equals half the optical channel payload unit area 14 rate of an ODU1. The latter is tailored for transport of STM-16/OC-48 signals at 2,488.32 Mbit/s. The ODU0 rate is 1,244.16 Mbit/s±20 ppm, while the rate of the available OPU0 payload area is 1,238.95431 Mbit/s.

Shown in FIG. 3 is a frame format 16 having two ODU0s multiplexed into an ODU1. The payload area of ODU1 frame format 16 of the latter has been divided into two time slots called optical channel tributary unit (or slots) 0 and 1 (ODTU01). As shown in FIG. 3, each ODU0 is mapped into an ODTU01 time slot using a procedure known in the art as asynchronous mapping procedure (AMP), which is consistent with the legacy mapping of ODUj into ODUk.

The optical channel data units within the multiplexing hierarchy are referred to in the art as lower order or higher order. A higher order optical channel data unit refers to a server layer to which a lower order optical channel data unit (client layer) is mapped to. Optical channel data units include a parameter referred to as tributary slot granularity which refers to a data rate of the timeslots within the optical channel data unit. The tributary slot granularity of optical channel data units include time slots of approximately 2.5 Gbit/s. OPUk (when k=1, 2, 3, 4) is divided into equal sized Tributary Slots or Time Slots of granularity (1.25 G or 2.5 G) to allow mapping of lower order ODUj (where j<k). For example: On OPU4, there are 80 (1.25 G) Tributary Slots. To map: ODU3 into OPU4=>31 TSs are used; ODU2/2e into OPU4=>8 TS are used; ODU1 into OPU4=>2 TSs are used; and ODU0 into OPU4 =>1 TS is used.

ODTUG refers to grouping of Tributary Slots that facilitates mapping of any ODUj into ODUk. ODTUjk refers to Optical Channel Tributary Unit j into k. This defines Tributary Slot grouping for mapping ODUj into ODUk. In particular, OPU2 and OPU3 support two tributary slot granularities: (i) 1.25 Gbps and (ii) 2.5 Gbps. Information indicative of tributary slot granularity can be encoded into the overhead of the ODUj optical channel data unit.

The current version of ITU-T G.709 (12/2009) of the generalized multiprotocol label switching supports "multi-stage ODU multiplexing", which refers to the multiplexing of lower order ODUj into higher order ODUk. The multistage ODU multiplexing can be heterogeneous (meaning lower order ODUj of different rates can be multiplex into a higher order ODUk).

Optical transport networks support switching at two layers: (i) ODU Layer, i.e., time division multiplexing and (ii) OCH Layer—Lambda or wavelength switching where OCH stands for Optical Channel. The nodes on the optical transport network may support one or both the switching types. When multiple switching types are supported Multi-Layer Network (MLN) based routing [RFC5339] is assumed.

Generalized Multiprotocol Label Switching includes multiple types of optical channel data unit label switched paths including protection and recovery mechanisms which specifies predefined (1) working connections within a shared mesh network having multiple nodes and communication links for transmitting data between the nodes; and (2) protecting connections specifying a different group of nodes and/or communication links for transmitting data in the event that one or more of the working connections fail. Data is initially transmitted over the optical channel data unit label switched path referred to as a working connection and then when a working connection fails, the Generalized Multiprotocol Label Switching protocol automatically activates one of the protecting connections for redirecting data within the shared mesh network.

However, the mechanisms defined in GMPLS for setting up the optical channel data unit label switched paths have overlooked a number of issues related to the multiplexing hierarchy. In particular, the present mechanisms defined in GMPLS define a separate optical channel data unit label switched path with reserved timeslots for each multiplexing level within the multiplexing hierarchy. This increases the size of databases stored by the nodes for managing the optical channel data unit label switched paths, and increases the amount of signaling between the nodes to set up the increased number of optical channel data unit label switched paths.

The presently disclosed and claimed inventive concepts support multi-stage multiplexing on an optical channel data unit label switched path to reduce the described drawbacks of the conventional GMPLS system.

SUMMARY

In one aspect, the present disclosure describes a method in which circuitry at a first node receives a signal indicative of a request to set up an optical channel data unit label switched path between the first node and a second node in a network. Time slots are reserved for a plurality of types of signals to be transmitted from the first node to the second node. A set up message is transmitted from the first node to the second node, the set up message identifying the plurality of signal types and reserved time slots. Then, an optical channel data unit label switched path is provided between the first and second nodes.

In another aspect, the present disclosure describes an apparatus having one or more non-transitory computer readable medium storing computer executable instructions that when executed by one or more processor cause the one or more processor to 1) reserve time slots for a plurality of types of signals to be transmitted from a first node to a second node via a network, 2) transmit a set up message from the first node to the second node, the set up message identifying the plurality of signal types and the reserved time slots, and 3) provide an optical channel data unit label switched path between the first and second nodes.

In yet another aspect, the present disclosure describes a node provided with an input interface for receiving traffic from a first communication link, an output interface for transmitting traffic to a second communication link, a switch for communicating the traffic from the input interface to the output interface, and a control module utilizing GMPLS protocols and controlling the input interface, the output interface and the switch. The control module has circuitry to provide an optical channel data unit label switched path having more than one multiplexing level within a multiplexing hierarchy of signals.

In the various aspects, the plurality of types of signals may identify multiplexing levels within a multiplexing hierarchy of signals, and the network may be selected from a group consisting of a shared-mesh GMPLS network, a linear GMPLS network, a ring GMPLS network and combinations thereof.

The set up message may include a multi-stage label having a number of multiplex stages field. In this version, the number of multiplex stages field has an identifier greater than one, such as two, three, four, five or the like. The set up message may also identify the reserved time slots using a bit map having bits in which the bits indicate time slots based upon the bits relative positions within the bit map.

In yet another version, the plurality of signals includes a first signal and a second signal, and wherein the bit map is a first bit map identifying reserved time slots for the first signal, and wherein the set up message further comprises a second bit map identifying reserved time slots for the second signal. Alternatively, the set up message may identify the reserved time slots using numbers identifying the reserved time slots.

BRIEF DESCRIPTION OF THE DRAWING

As discussed above, the present disclosure describes a system which supports multi-stage multiplexing on an optical channel data unit label switched path which preferably includes a multi-stage label to provide compact encoding of tributary slot information and supports the reservation of time slots for multiple types of signals for the optical channel data unit label switched path within a multiplexing hierarchy of signals.

The accompanying drawings, which are incorporated in and constitute a part of this specification, illustrate one or more implementations described herein and, together with the description, explain these implementations. In the drawings:

FIG. 1 is a diagram of a prior art multiplexing hierarchy utilized for communicating between nodes within a network.

FIG. 2 is a block diagram of a prior art optical channel data unit frame format that may be used in embodiments of the inventive concepts described within the present disclosure.

FIG. 3 is a block diagram of two ODU0 optical channel data units multiplexed within an ODU1 frame.

FIG. 7 is a block diagram of a section of the network depicted in FIG. 5 having varying multiplexing levels employed in embodiments of the present disclosure.

FIG. 8 is a block diagram of yet another exemplary network illustrating a method of setting up a ODU0 label switched path having varying signal types within a multiplexing hierarchy.

FIG. 9 is a diagram of an exemplary multi-stage label employed in embodiments of the present disclosure.

DETAILED DESCRIPTION

The following detailed description refers to the accompanying drawings. The same reference numbers in different drawings may identify the same or similar elements.

Definitions

If used throughout the description and the drawings, the following short terms have the following meanings unless otherwise stated:

AMP stands for Asynchronous Mapping Protocol.

DCC stands for Dedicated Data Communication Channels.

GCC stands for General Communication Channel which is an in-band side channel used to carry transmission management and signaling information within Optical Transport Network elements.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Multi-Protocol Label Switching network. Note that Label Switched Paths can be bidirectional or unidirectional; they enable packets to be label switched through the Multi-protocol Label Switched network from a port on an ingress node to a port on an egress node.

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OTN stands for Optical Transport Network which includes a set of optical switches which are connected by optical fiber links.

SONET/SDH stands for Synchronous Optical Networking/Synchronous Digital Hierarchy which are standardized multiplexer protocols that transfer multiple digital bit streams over optical fiber using lasers or light emitting diodes.

Description

Figure 4:
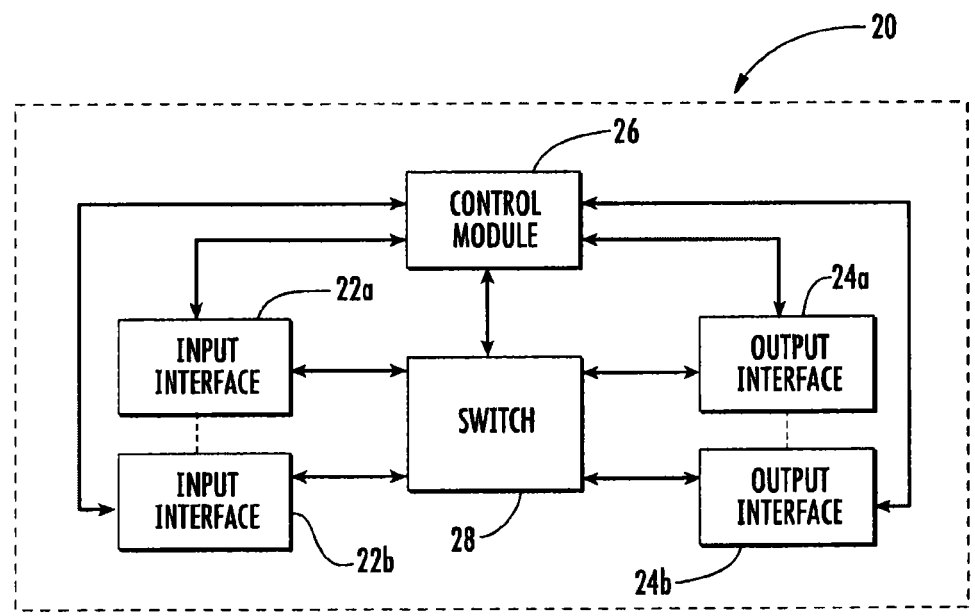
FIG. 4 is an exemplary switch node constructed in accordance with the present disclosure.
Figure 5:
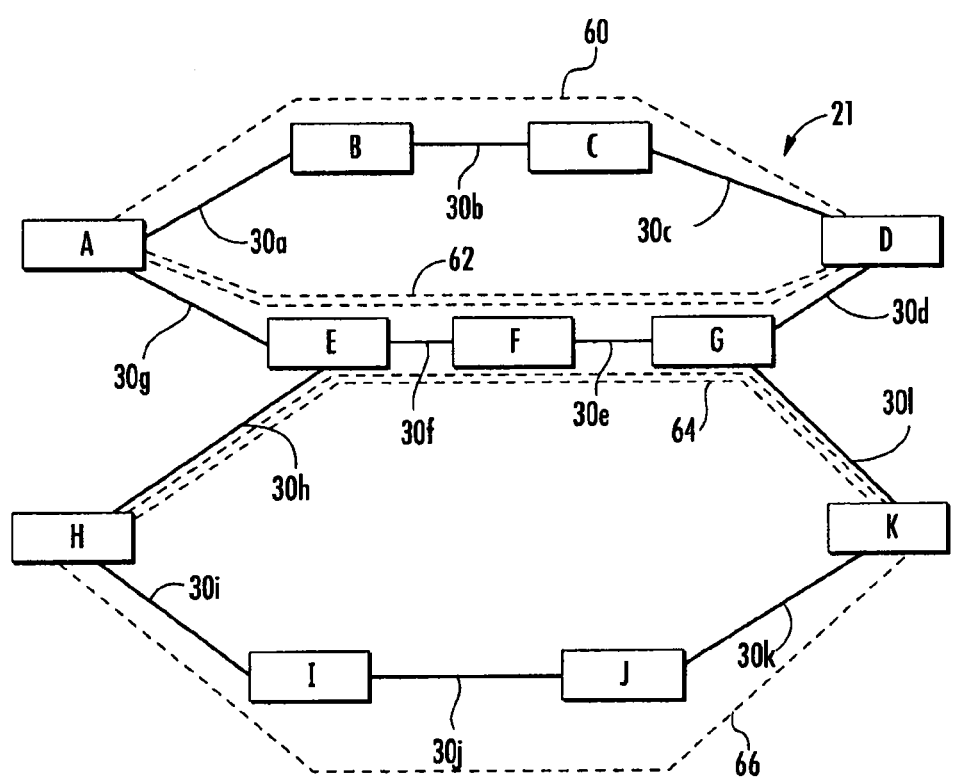
FIG. 5 is a block diagram of an exemplary network constructed in accordance with the present disclosure.

Referring now to the drawings, and in particular to FIG. 4, shown therein and designated by reference numeral 20 is an exemplary node constructed in accordance with the present disclosure. As will be discussed in more detail below, the node 20 is adapted to facilitate the communication of data (which may be referred to herein as "traffic") between multiple nodes 20 in a mesh network 21 (as shown in FIG. 5 with the notations A-K). The node 20 is provided with one or more input interfaces 22, one or more output interfaces 24, a control module 26, and a switch 28.

In general, the input interfaces 22 are adapted to receive traffic from the mesh network 21, and the output interfaces 24 are adapted to transmit traffic onto the mesh network 21. The switch 28 serves to communicate the traffic from the input interface(s) 22, to the output interface(s) 24. And, the control module 26 serves to control the operations of the input interfaces 22, the output interfaces 24, and the switch 28, as well as to set up label switched paths within the mesh network 21.

The node 20 can be implemented in a variety of manners, including, commercial installations having one or more backplanes (not shown), racks, and the like. In this example, the input interfaces 22, the output interfaces 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interfaces 22, the output interfaces 24, the control module 26 and the switch 28 share a power supply and/or housing.

The input interfaces 22, and the output interfaces 24 of one node 20 are adapted to communicate with corresponding input interfaces 22, and output interfaces 24 of another node 20 within the mesh network 21 via communication links 30, which are shown for purposes of clarity as 30a-l (as shown in FIG. 5). An example of an input interface 12 and/or an output interface 14 is an Ethernet card or optical port. In general, each of the input interfaces 22 and/or the output interfaces 24 may have a unique logical identification, such as an IP address. The communication links 30a-l can be implemented in a variety of manners, such as a physical link including electrical (e.g., copper wire or coax) and/or optical signal (e.g., optical fiber or other waveguide) carrying capabilities, or as a wireless link. The implementation of the input interfaces 22, and the output interfaces 24 will depend upon the particular type of communication link 30 that the particular input interface 22 and/or output interface 24 is designed to communicate with. For example, one of the input interfaces 22 can be designed to communicate wirelessly with another node 20 within the mesh network 21, while one of the output interfaces 24 of the node 20 can be designed to communicate optically through a fiber-optic link. For a particular node 20, the input interfaces 22 can be of the same type or different types; the output interfaces 24 can be of the same type or different types; and the input and output interfaces 22 and 24 can be of the same type or different types.

The input interfaces 22 and the output interfaces 24 are shown separately for purposes of clarity. However, it should be understood that one or more of the input interfaces 22 and/or the output interfaces 24 could be connected to a single communication link 30 and implemented as a single device, such as a line module. The making and using of exemplary line modules are described in the patent application identified by publication no. 20090245289, the entire content of which is hereby incorporated herein by reference.

Figure 6:
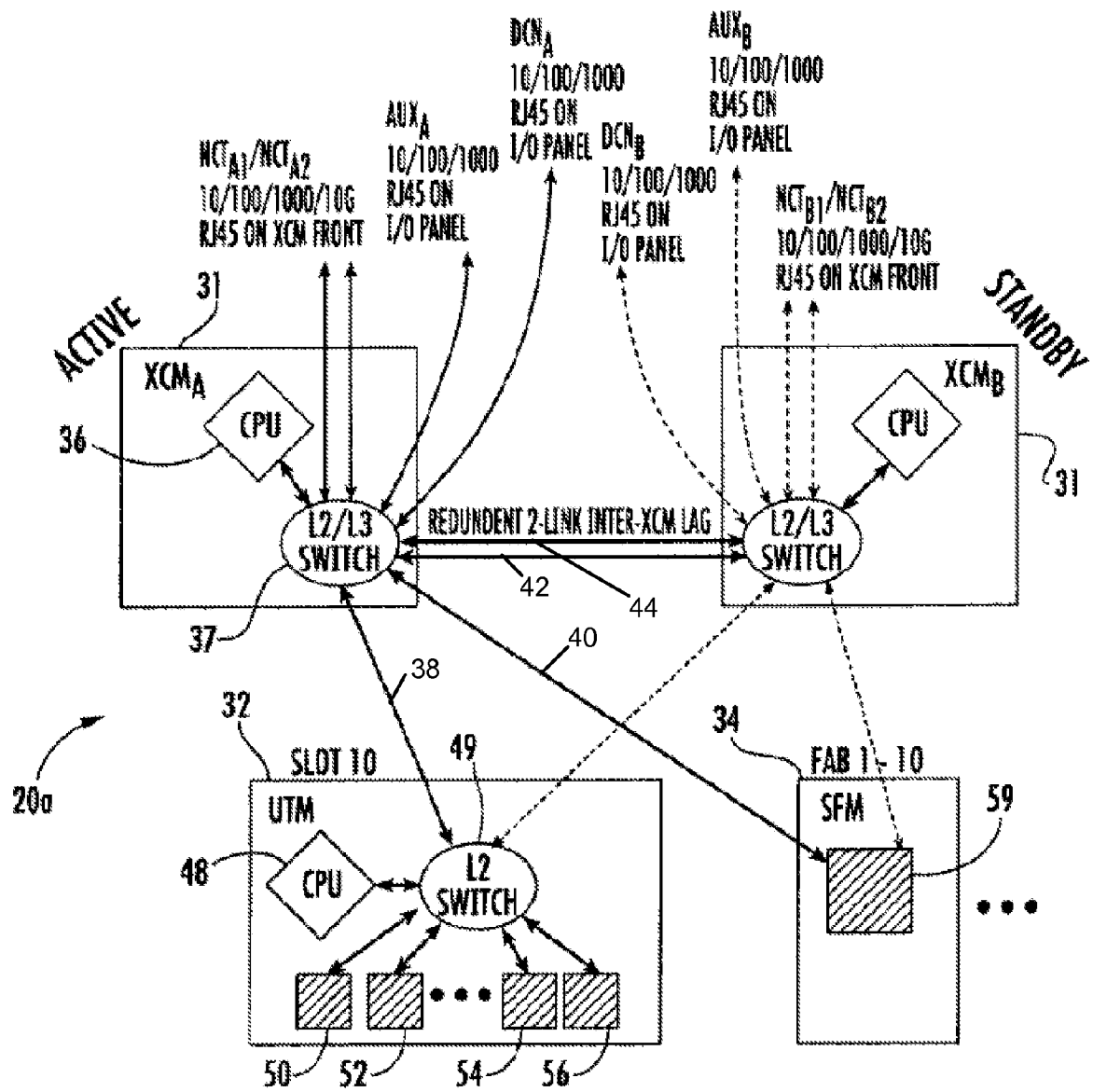
FIG. 6 is a block diagram of another version of a switch node constructed in accordance with the present disclosure.

Referring now to FIG. 6, shown therein is a particular embodiment of a node 20a where such node 20 is implemented in a modular manner. The node 20a is provided with one or more XTN control modules (XCM) 31, one or more universal transport modules (UTM) 32, and one or more switch fabric modules 34. In the example depicted in FIG. 2, the node 20a is provided with at least two XTN control modules 31, with at least one of the XTN control modules 31 being actively used, and the other one of the XTN control modules 31 being available as a backup in the event the actively used XTN control module 31 fails or is taken off-line. In general, the XTN control modules 31 are particular implementations of the control module 26 depicted in FIG. 1; the universal transport module 32 is a particular implementation of the input interfaces 22 and the output interfaces 24; and the switch fabric module 34 is a particular implementation of the switch 28.

In general, the XTN control module 31 is provided with one or more processors 36, which is shown by way of example as a CPU. However, it should be understood that the processors 36 can be implemented in other manners such as field programmable gate array(s) (FPGA), digital signal processor(s), or the like. The XTN control module(s) 31 are also provided with a L2/L3 switch 37 (i.e. Layer 2/Layer 3 switch). The XTN control module(s) 31 are also provided with one or more input/output interfaces which are shown by way of example as the arrows 38, 40, 42, and 44.

The universal transport module 32 is provided with one or more processors 48; one or more L2 switch 49; and one or more transport interface modules 50, 52, 54, and 56 communicating with the L2 switch 49 (i.e., Layer 2 switch). The L2 switch 49 also communicates with the control plane L2/L3 switch 37 for communicating control messages between the universal transport module 32 and the XTN control module(s) 31. The one or more processors 48 is shown by way of example as a CPU; however, it should be understood that the one or more processors 48 can be implemented in other manners such as a field programmable gate array(s) (FPGA), digital signal processor(s), or the like. Certain ones of the transport interface modules 50, 52, 54 and 56 form input interfaces, and other ones of the transport interface modules 50, 52, 54 and 56 form output interfaces. For example, the transport interface modules 50 and 52 can form input interfaces, and the transport interface modules 54 and 56 can form output interfaces.

It should be understood that the nodes 20 and/or 20a can be implemented in a variety of manners including those shown and discussed in U.S. Patent Application No. 20090245289 entitled "Programmable Time Division Multiplexed Switching" the entire content of which is hereby incorporated herein by reference.

Referring now to FIG. 5, shown therein is the mesh network 21 formed of multiple nodes 20 and/or 20a which are labeled as A-K in accordance with the present disclosure. The mesh network 21 can include more than eleven nodes, such eleven are shown for purposes of clarity. In particular, the nodes A, B, C and D are configured to communicate via a first optical channel data unit label switched path 60 along the communication links 30a, 30b, and 30c; while the nodes A, E, F, G and D are also configured to communicate via a second optical channel data unit label switched path 62 via the communication links 30d-g. The first optical channel data unit label switched path 60 may be a working connection, and the second optical channel data unit label switched path 62 may be a protecting connection. Any two nodes A-K may connect via multiple optical links 30. For bidirectional communication, for example, an optical link or fiber may be dedicated for data traffic transmitted in one direction (or both directions), another optical link may be dedicated for data traffic transmitted in the opposite direction, and yet another optical link may be used in case of a failure of the connection. In practice, there may be N working connections and M protecting connections between any two of the nodes A-K, where M<N.

Figure 10:
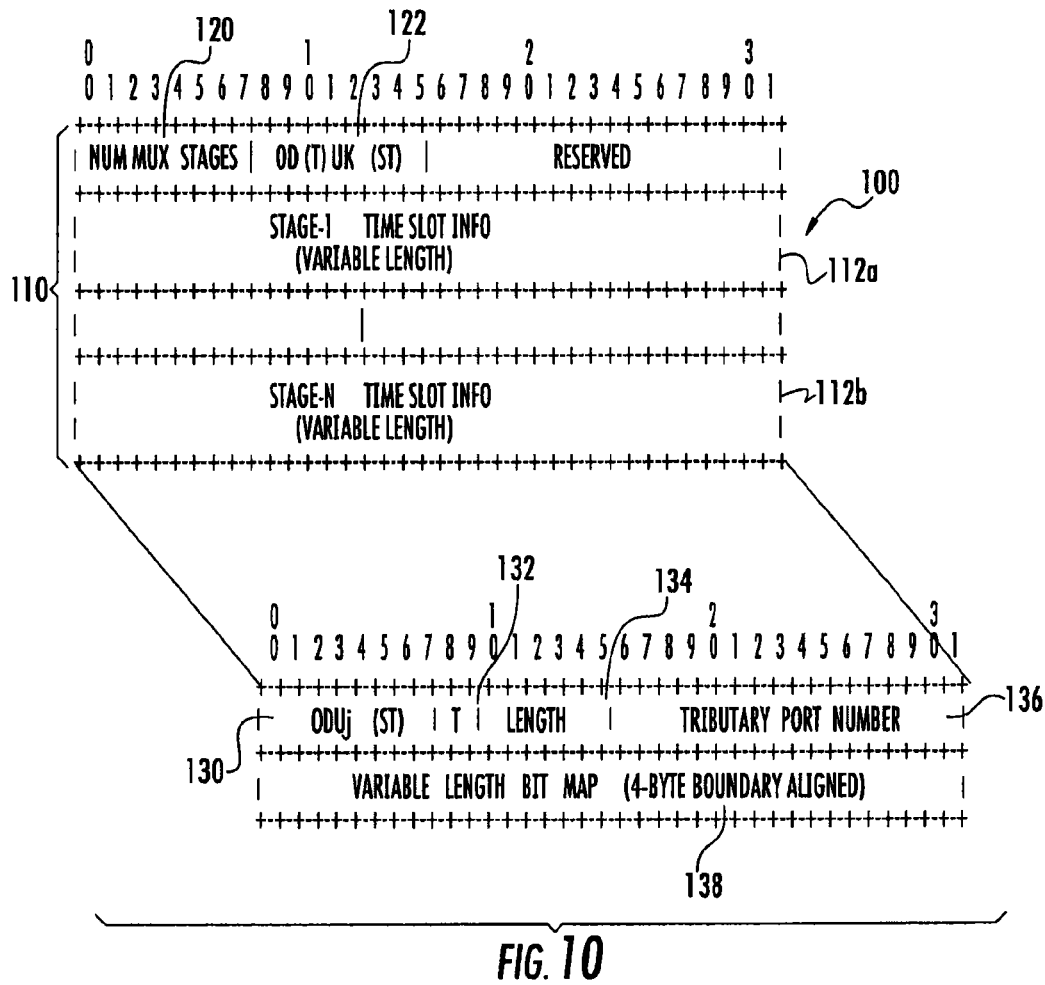
FIG. 10 is a schematic diagram of an exemplary multi-stage label utilized to set up an optical channel data unit label switched path in accordance with embodiments of the present disclosure.

FIG. 5 outlines an exemplary operation environment for a signaling protocol stored on one or more non-transitory computer readable medium and executed by a processor of the control module 26 and/or XTN control module 31 of each of the nodes A-K for setting up the first and the second optical channel data unit label switched paths 60 and 62 using set up message with label format as shown by the reference numeral 100, an example of which is shown in FIG. 10. The nodes A-K are preferably adapted to setup and maintain the first and the second optical channel data unit label switched paths 60 and 62 through signaling protocols of the shared-mesh GMPLS network 21. The set up message with label format 100 are generated and provided to the relevant nodes A-K preferably using an in band or out of band communication channel (e.g., GCC, OSC, DCC) of the shared-mesh GMPLS network 21. In other words, the set up messages with label format 100 are preferably transmitted on a different communication link than is used to convey user traffic or data such as the communication links 30a-I. However, it should be understood that the set up messages 100 can be delivered through in-band channels, such as DCC in SONET/SDH, or GCC in OTN interfaces. DCC stands for Data Communications Channel and is a channel used to convey control and management information along the same optical path utilized for conveying user traffic. GCC stands for General Communication Channel and is also used to convey control and management information along the same optical path utilized for conveying user traffic). This is further described, for example, in reference [Reference 1]. In-band signaling utilizes the same channel that carries the data traffic, such as the protecting connection that is being activated in accordance with the present disclosure. The in-band channel bandwidth varies depending on network design, and is nevertheless sufficient for control traffic distribution.

1. In-band Signaling and GMPLS Signaling Extensions

In the mesh network 21, an operator may choose to set up one or more connections through an in-band communication channel 30a-l, such as the DCC or the GCC.

Typically, at each intermediate node shown by way of example as the node B of FIG. 5, the in-band messages are delivered to the control module 26 for extensive processing. The control module 26 (see FIG. 4) can be a logical entity that can be implemented in a variety of manners. However, for efficiency, it is possible to process some set up messages 100, by circuitry within the input interface(s) 22 and/or the output interface(s) 24 directly. In other words, the input interface 12, and/or the output interface 14 and/or the universal transport module 32 may pick up and process the set up messages 100 from in-band channels and deliver the set up messages 100 to the control module 26, other input interfaces 22 and/or output interfaces 24 and/or the switch fabric module 34 after processing. In accordance with the present disclosure, control messages on the control channel may be processed by circuitry within the input interface(s) 22, and/or the output interface(s) 24 and/or the universal transport module 32 and then the control module 26 may be notified of any actions taken. Circuitry could be analog and/or digital, components, or one or more suitably programmed microprocessors and associated hardware and software, or hardwired logic. Further, the input interface(s) 22 and/or the output interface(s) 24 retrieve information from the control module 26 regarding the protecting connections and the like for processing the control messages. By way of example, the input interfaces 22, and/or the output interfaces 24, and/or the universal transport module 32 will be described hereinafter as line modules for purposes of clarity.

To implement shared-mesh restoration, each line module needs to keep track of the connections and associated network resources (e.g. time slots in a time-division multiplexing switching). Upon the reception of activation messages from in-band channels, the line modules can identify the protecting connections, and activate them accordingly.

Each connection can be identified and processed as a label switched path (LSP) by way of example. By way of example, the control module 26 and/or the XTN control module 31 can establish the bi-directional (upstream and downstream) LSPs inside the in-band channels. Each of the links shown in the drawings includes an underlying physical/optical connection. Further, each LSP can be activated using an in-band channel of the underlying physical/optical connection carrying user traffic.

Exemplary components of a line module are shown and described with reference to FIG. 3 of U.S. Patent Publication No. 20090245289, which disclosure is incorporated herein by reference. Exemplary components of the switch fabric module 34 are shown and described with reference to FIG. 6 of U.S. Patent Publication 20090245289, which disclosure is also incorporated herein by reference.

2. Out-band IP Signaling

In certain scenarios, the operators may choose to set up connections through an out-band communication link, such as an IP network. An out-band IP network is not a part of the mesh network 21. In other words, out-band signaling does not use the data path carrying the user traffic, rather, it utilizes separate channels. An example of an out band IP signaling would be a DCN data communication network in Sonet.

In this case, since each headend node, i.e., the node A in FIG. 5, has the knowledge of all the other nodes B-K within the network 21 from the Reservation Protocol (RSVP) Explicitly Route Object/Recording Routed Object (ERO/RRO objects), the headend node A can initiate point-to-point IP messages to set up the optical channel data unit label switched paths simultaneously for quick setup. Alternatively, the headend node A can set up the optical channel data unit label switched paths using a hop by hop process.

In addition, it is possible that set up messages for a particular optical channel data unit label switched path may be delivered and processed in both in-band and/or out-band. One or multiple nodes 20 or 20a on the connection may rely on in-band signaling, while some others use out-band signaling. In other words, for compatibility purposes, if a node does not support in-band signaling, then such nodes can be activated using out-band signaling. In this document, we will focus more on out-band signaling, and treat the in-band signaling as special cases.

3. Operation Outline

Throughout the remainder of this description, the operation of the nodes 20 or 20a to form the mesh network 21 depicted in FIG. 5 will be described. In FIG. 5, the nodes 20 and/or 20a are provided with alphabetic designations A, B, C, D, E, F, G, H, I, J and K. In this example, the mesh network 21 includes headend nodes A and H; tailend nodes D and K; and intermediate nodes B, C, E, F, G, I and J. The mesh network 21 also includes two label switched paths 60 and 64 (e.g., working connections) which are shown by the single dashed lines; and two label switched paths 62 and 66 (e.g., protecting connections) that are shown by the double dashed lines. Thus, the working connections are formed by the nodes {A, B, C, D}, {H, I, J, K}; and the protecting connections are formed by the nodes {A, E, F, G, D}, and {H, E, F, G, K}.

In this example, the links between E, F and G are shared by both protecting connections. The working and protecting connections are established by the nodes A-K using the set up messages 100 and in combination with the GMPLS protocols discussed below.

FIG. 7 is a block diagram of a section of the network 21 depicted in FIG. 5 showing nodes A-D having varying multiplexing levels employed in embodiments of the present disclosure. In particular, node A includes a single stage multiplexing hierarchy in which ODU0 is directly supported over ODU2. Node B and node C, on the other hand, are adapted to communicate utilizing more than one multiplexing level within the multiplexing hierarchy. For example, node B and node C are adapted to communicate such that ODU0 is supported over ODU3 and also over ODU4. In accordance with the present disclosure, the first optical channel data unit line switched path includes two multiplexing levels, i.e., ODU3 and ODU4, and there may not be a separate ODU3 label switched path created between node B and node C. Node D is adapted similarly to node A and includes a single stage multiplexing hierarchy in which ODU0 is directly supported over ODU2. In this example, node A has 8 timeslots for communicating with node B in accordance with the ODU2 format; nodes B and C have 80 timeslots in accordance with the ODU4 format; and node D has 8 timeslots for communicating with node C in accordance with the ODU2 format.

FIG. 8 is a block diagram of the section of the network 21 depicted in FIG. 7 showing nodes A-D having the varying multiplexing levels discussed above. In particular, FIG. 8 illustrates an example in which the first optical channel data unit label switched path is set up as an ODU0 label switched path. To set up the first optical channel data unit label switched path 60, the headend node A originates, with circuitry at the headend node A a signal indicative of a request to set up the first optical channel data unit label switched path between nodes A and D, reserves a timeslot, and then passes a set up message with the multi-stage label 110 to node B.

The set up message passed from node A to node B identifies the number of multiplexing stages equal to one, identifies the signal type as ODU0, identifies the reserved timeslot, identifies a tributary slot granularity, and a tributary port number. The tributary slot granularity facilitates interpretation of the encoded information within a time slot of the optical channel data unit. The tributary port number is used to correlate the timeslots used for mapping a lower order optical channel data unit onto a higher order optical channel data unit. The tributary port number is exchanged such that each neighbor on a span knows the tributary port number value to expect for optical channel data unit mapping. The tributary port number preferably applies to each stage associated with a multi-stage label 110 shown in FIG. 10.

Node B receives the set up message, reserves the timeslot for communicating with node A, and also reserves timeslots for a plurality of types of signals to be transmitted from node B to node C. Node B then generates and transmits the set up message with the multi-stage label 110 to node C with the set of message identifying a plurality of signal types and reserved timeslots. For example, the set up message identifies the number of multiplexing stages as two, and then has two stages 112a and 112b with the first stage 112a identifying the signal type as ODU3, tributary slot granularity equals 1.25 Gbps, reserves 31 timeslots out of a set of 80 and with the tributary port number equal to 5; the second stage 112b identifies the signal type as ODU0, the tributary slot granularity as 1.25 Gbps, reserved timeslot as one out of a set of 32, and the tributary port number equal to 7. The set up message having the label format 100 is received by the Node C which creates ODU3 mux layer using 32 timeslots specified in the multi-stage label 110. Upon successful creation of UDU3 multiplex layer, the ODU0 LSP is created using time slots specified in the multi-stage label 110 within the set up message. The process described above preferably repeats on a hop by hop basis until the ODU0 label switched path has been setup.

Protocol Definition—Set Up Messages

In a preferred embodiment, the signaling protocol defines the following set up message which can be initiated and/or processed by the control modules 26 and/or 31 of the nodes A-K to set up the (working, protecting, unprotected or restoration) connections. The set of message includes the multi-stage label 110.

FIG. 9 is a schematic diagram of an exemplary multi-stage label 110 in accordance with the present disclosure. The present disclosure extends [RFC4328] to provide GMPLS signaling support for the new optical transport network capabilities defined in [G.709-v3] and [GSUP.43]. The signaling extensions described herein cater to ODU layer switching.

The following extensions are described herein (i) G.709 Traffic Parameters defined in [RFC4328] is extended to include Bit Rate (in bytes/second) and Tolerance (in ppm) fields for supporting ODUflex service as will be described in more detail below with respect to FIG. 11, and (ii) a multi-stage label 110 format for the set up messages 100 is introduced to provide compact encoding of Tributary Slot information and support multi-stage multiplexing as will be described below with reference to FIG. 10.

As background, the G.709 Traffic Parameter and Generalized Label Format defined in [RFC4328] supports single stage multiplexing only. The multi-stage label 110 format described in accordance with the present disclosure supports one, two, three or more multiplexing levels (which may also be referred to herein as a "stage"). The label format includes a label first stage, and preferably a label second stage as shown in FIG. 8.

Shown in FIG. 10 is an example set up message generated and passed in accordance with the present disclosure. The set up message may be adapted to provide support for a variety of types of ODU containers, such as ODU1, ODU2, ODU3, ODU0, ODU2e, ODU4, ODU1e, ODU3e1, ODU3e2, flexible ODU containers such as ODUflex for CBR and GFP-F mapped services. Unlike the other ODUj signal types, ODUflex requires a user specified bit-rate (together with a Tolerance value) to be mapped to 'n' tributary slots of a higher-order container. Even within the same Tributary Slot Granularity, the Tributary Slot size varies among the ODU container of different rate. This results in ODUflex service of certain bit-rate and tolerance having different number of tributary slots on different higher order ODU containers. The present way of specifying bandwidth requirement (via NMC field in G.709 Traffic Parameters) will not work for ODUflex. G.709 Traffic Parameters objects need to be extended to include Bit-Rate (in bytes/sec) and Tolerance (in ppm) fields as well.

The G.709 Traffic Parameters and Generalized Label Format defined in [RFC4328] supports 2.5 Gbps Tributary Slot Granularity only. With [G.709-v3], two types of tributary slots are supported—viz., 1.25 Gbps and 2.5 Gbps. The label format of the set up messages 100 should be equipped with Tributary Slot Type indicator to facilitate interpretation of the encoded time slot information.

A Tributary Port Number (TPN) in MSI field of OPU-OH can be used to correlate the timeslots used for mapping a low order ODU on a high order ODU. This can be exchanged along with the set up message such that each neighbor on a span knows the TPN value to expect for a given ODUj mapping. This preferably applies to each stage associated with the multi-stage label 110.

As explained above, the Generalized Label format defined in [RFC4328] can not accommodate the new features added in [G.709v3]. Further the label format as defined in [RFC4328] is not scalable for large number of Tributary Slots (at 1.25 G granularity) associated with bigger containers such as ODU3 and ODU4. The multi-stage label 110 shown in FIG. 10 preferably includes time slot and tributary port number information for all stages of a multi-stage multiplexing hierarchy. An exemplary format of the multi-stage label 110 is explained below.

The multi-stage label 110 includes a number of mux stages field 120, a signal type field 122, and one or more stages 112a and 112b. The number of mux stages field 120 indicates the number of multiplexing stages specified by the multi-stage label 110, such as 1, 2, 3, 4, etc. The signal type field 122 indicates the signal type of a higher order ODUk or OTUk container and preferably the highest order multiplexing level.

A more detailed view of an exemplary stage field 112b is shown in FIG. 10. Each stage 112 preferably has the following sub-fields: ODUj 130, tributary slot granularity 132, length 134, tributary port number 136, and reserved time slots 138. The ODUj field 130 indicates the signal type of a lower order ODU being multiplexed into a higher order ODU such as an immediately higher order ODU. The Tributary slot granularity field identifies the data rate of the tributary slots for this multiplexing stage 112. For example, the tributary slot granularity field 132 can be a 2 bit field, which defines the granularity of tributary slots for this multiplexing stage 112 and can take the following values: 0 for tributary slot granularity type 1.25 Gbps; 1 for tributary slot granularity type 2.5 Gbps and 2-3 reserved for future use. Of course, more bits can be added to identify more tributary slot granularity types and different bit patterns can be used. The reserved time slot field 138 is preferably a variable length field as discussed below. The length field 134 indicates the number of valid bits in the reserved time slot field 138 preferably excluding any filler bits.

The tributary port number field 136 is preferably encoded with a tributary port number value assigned for an Optical Channel Data Tributary Unit j into k (ODTUjk) or Optical Channel Data Tributary Unit k with is tributary slots (ODTUk.ts) on an Optical Channel Payload Unit (OPUk). The tributary port number assignment could be fixed or flexible. For fixed tributary port number assignment scheme, the tributary port number value need not be specified. In this case, the tributary port number value may be coded as 0xFFFFFFFF. For a flexible tributary port number assignment scheme, the tributary port number value should contain an assigned logical value. Further, all or less than all the bits of the tributary port number field 136 can be used. Preferably, only a subset of the bits are used depending on the OPUk type. For example, if the ODU container is from ODU1 to ODU3, then 0-5 bits can be used. If the ODU container is ODU4, then 0-6 bits can be used. More bits can be reserved, if desired, and the reserved bits could be coded with a predetermined pattern, such as zeros for a flexible assignment scheme.

The reserved time slot field 138 can be a multi-byte bit map field with a length depending on the number of time slots associated with the higher order -ODU pertaining to the stage. Timeslot and OPU Tributary Slots are used interchangeably herein. In this example, each bit represents one time slot and each bit identifies its time slot based upon the bits relative position within the reserved time slot field. Bit values can be interpreted as follows: bit value 0 can mean the time slot is not used; and bit value 1 can mean the time slot is used. Alternatively, the bit value 1 can mean the time slot is not used; and bit value 0 can mean the time slot is used. This field can be 4 byte aligned using filler bytes. In other words, if information regarding the time slot bits uses less than 4 bytes, then padding or filler bits can be used. Alternatively, one or more reserved time slot field 138 can be used with each time slot identified explicitly rather than being identified as a position within a bit map.

For example, the multi-byte bit map can represent data formed by a series of binary digits (0/1). For ODU2 mapping on to ODU3, this requires 8 tributary slots of total 32 tributary slots (available on ODU3). Assume that tributary slots 1, 3, 5, 7, 9, 11, 13, and 15 are used for this mapping. The bit map representation will be 32 bits (4 words) is coded as follows:

10101010 10101010 0000000 0000000

Figure 11:
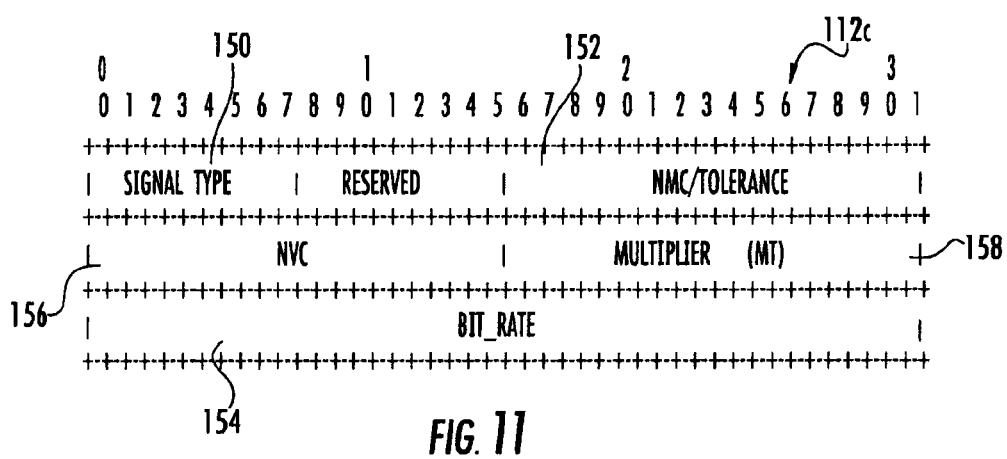
FIG. 11 is a schematic diagram of an exemplary timeslot information message for setting up an optical channel data unit label switched path for a signal type having a varying bit rate such as ODUflex.

Shown in FIG. 11 is a modified object format used when one of the stages is a variable rate ODU connection, such as ODUflex. G.709 Traffic Parameters defined in [RFC4328] can be extended to include additional fields in support of ODUflex service as explained in the previous section. The modified object format is shown in FIG. 11 and may include the following fields: signal type 150; NMC/Tolerance 152, Bit_Rate 154, Number of Virtualized Components (NVC) 156 and Multiplier 158. The signal type field 150 identifies a specific type of ODU container to be used. The NMC/Tolerance field 152 may be redefined from the original definition set forth in [RFC4328]. The NMC field defined in [RFC4328] can not be a fixed value for an end-to end circuit involving dissimilar OTN link types. For example, ODU2e requires 9 TS on ODU3 and 8 TS on ODU4. Usage of NMC field is deprecated and should be used only with [RFC4328] generalized label format for backwards compatibility reasons. For the multi-stage label 110 format described in the present disclosure, the NMC/Tolerance field 152 is interpreted as Tolerance. The tolerance can be specified as an unsigned integer in any suitable format such as ppm. For signal types other than ODUflex, the Tolerance field should be coded as 0.

The bit_rate field 154 can be used when the rate is variable, such as when the signal type is ODUFlex. The bit_rate field 154 desirably contains an identification of a particular bit rate in bytes/second. However, other identifications of bit rate can be used, if desired. For fixed rate signal types, the bit_rate field 154 is preferably coded as a predetermined pattern, such as all zeroes.

Information indicative of bit_rate and tolerance can be used together to compute a number of tributary slots required for ODUFlex(CBR) traffic on a given higher order ODU container. The computation of Number of Tributary Slot (n) can be as follows: n=(Ceiling of bit_rate*(1+Tolerance))/ODTUk.ts nominal bit rate * (1-higher order OPUk bit rate tolerance).

Label Distribution Rules and Procedures

To set up an optical channel data unit label switched path, the set up message having the multi-stage label 110 is passed between nodes A-K in accordance with the distribution procedures defined in [RFC4328] except that the new multi-stage label 110 should be processed as follows. When a signal indicative of a request to set up an optical channel data unit label switched path, such as a "Generalized Label Request" is received on given node A-K for setting up the optical channel data unit label switched path from its upstream neighbor, the node reserves the time slots required on a network interface, such as the input interface 22, and the sends the set up message having the multi-stage label 110 back to the upstream neighbor. Note that Label can be specified as a part of an ERO object, and can also optionally be explicitly specified by source node. The Label can be configured on the head-end of an optical channel data unit label switched path.

The encoding of the multi-stage label 110 is as follows: For ODUj to ODUk multiplexing, the length field indicates the number of time slots supported on ODUk. Time slots reserved for ODUj are markeas 1. For ODUk to OTUk mapping, the length field is coded as 0 and the reserved d time slot field is not included.

Once one of the nodes receives the set up message, for ODUj to ODUk multiplexing, the node extracts the reserved time slot field using the Length field. The position of bits in the reserved time slot field can be interpreted as the Trib Slot Number. The value stored in the bit indicates if it is reserved for the ODUj. For ODUk to OTUk mapping, the length is 0. Hence, the reserved time slot field is not expected.

Interoperability Considerations

Figure 12:
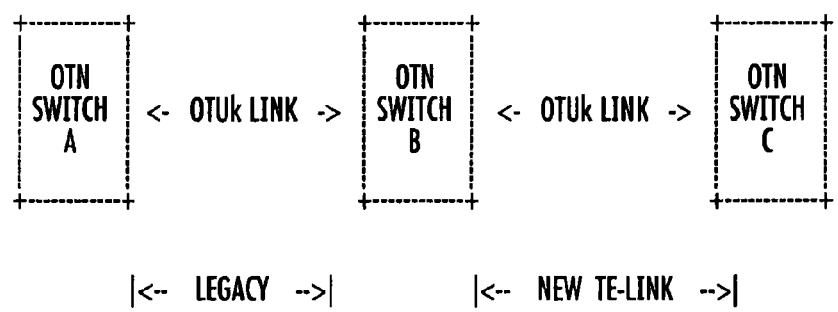
FIG. 12 is a block diagram of an exemplary network having varying multiplexing levels illustrating optional backwards compatibility for certain embodiments of the present disclosure.

Neighbor nodes on a TE-Link span such as the communication links 30*a*-l should exchange the signaling stack versions (via some link discovery mechanism) in order to determine whether neighbor nodes both support the multi-stage label 110 described herein, and if not, another label format can be used which is supported by both neighbor nodes to set up the optical channel data unit label switched paths. As shown in FIG. 12, nodes B and C are running a version of signaling stack that support the multi-stage label 110 of the set up message described herein while node A is running a legacy version that does not support the multi-stage label 110 of the set up message, such as G.709-v1 version (2001) based on OTUk link with a tributary slot granularity of 2.5 Gbps. In this case, set up messages between nodes A and B can use a label format as per RFC 4328, while set up messages 100 between nodes B and C can use the multi-stage label 110 described above.

Thus, for an ODU2 connection going from A-C, on link A-B: NMC is set to 4 and the [RFC4328] label format is used, while on link B-C: NMC is not used & the multi-stage label is used.

Conclusion

Thus, it will be appreciated that in the mesh network 21 where an operator allocates a common set of network resources such as timeslots on nodes 20 or 20*a* to set up optical channel data unit label switched paths, there was not a known mechanism that enabled operators of the nodes 20 and/or 20*a* to set up an optical channel data unit label switched path with time slots reserved for multiple types of signals within a multiplexing hierarchy of signals. The multi-stage label 110 described herein as processed by the nodes 20 and/or 20*a* reserve multiple time slots for different signal types on the optical channel data unit label switched path. This reduces the number of traffic engineered links within the network, as well as the number of optical channel data unit label switched paths within the network by reducing and/or eliminating hierarchical label switched paths at lower multiplex levels before creation of the optical channel data unit label switched path. Though the methodologies set forth herein are in the context of a shared mesh network that is optically based, such methodologies may apply to all transport networks that utilize a multiplexing hierarchy of signals.

The presently disclosed and claimed inventive concepts that can set up optical channel data unit label switched paths in a more efficient and effective manner which may increase the number of ODU0 label switched paths within the network 21 in certain deployments where OTU4 links are used for node to node connectivity and thereby improve revenue for customers. The presently disclosed concepts cover a broad range of scenarios including: support for both in-band and out-band set up.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

In addition, information regarding the optical channel data unit label switched paths can stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes 10 or 10a. In this situation, the nodes 10 or 10a may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Also, as used herein, the article "a" is intended to include one or more items. Where only one item is intended, the term "one" or similar language is used. Further, the phrase "based on" is intended to mean "based, at least in part, on" unless explicitly stated otherwise.

References

The following references are hereby incorporated herein by reference.

[Reference 1] ITU-T Recommendation G.709 "Interfaces for the optical transport network (OTN)"

[RFC2119] Bradner, S., "Key words for use in RFCs to Indicate Requirement Levels".

[RFC3630] Katz, D., Kompella, K., and D. Yeung, "Traffic Engineering (TE) Extensions to OSPF Version 2", RFC 3630

[RFC3471] Berger, L., "Generalized Multi-Protocol Label Switching (GMPLS) Signaling Functional Description", RFC 3471, January 2003.

[RFC4201] Kompella, K., Rekhter, Y., and L. Berger, "Link Bundling in MPLS Traffic Engineering (TE)"

[RFC4203] Kompella, K. and Y. Rekhter, "OSPF Extensions in Support of Generalized Multi-Protocol Label Switching (GMPLS)"

[RFC4204] Lang, J., Ed., "Link Management Protocol (LMP)", RFC 4204, October 2005.

[RFC4328] Papadimitriou, D., "Generalized Multi-Protocol Label Switching (GMPLS) Signaling Extensions for G.709 Optical Transport Networks Control", RFC 4328, January 2006.

[RFC5339] Le Roux, J L. and D. Papadimitriou, "Evaluation of Existing GMPLS Protocols against Multi-Layer and Multi-Region Networks (MLN/MRN)", RFC 5339, September 2008.

[G.709-v3] ITU-T, "Interfaces for the Optical Transport Network (OTN)", G.709 Recommendation, December 2009.

[RFC3945] Mannie, E., "Generalized Multi-Protocol Label Switching (GMPLS) Architecture", RFC 3945, October 2004.

[G.709-v1] ITU-T, "Interface for the Optical Transport Network (OTN)," G.709 Recommendation (and Amendment 1), February 2001 (October 2001).

[G.872] ITU-T, "Architecture of optical transport networks", November 2001 (11 2001).

What is claimed is:

1. A method comprising the steps of:
receiving, with circuitry at a first node, a signal indicative of a request to set up an optical channel data unit label switched path between the first node and a second node in a network;
reserving time slots for a plurality of types of signals to be transmitted from the first node to the second node, the plurality of types of signals identify multiplexing levels within a multiplexing hierarchy of signals;
transmitting a set up message from the first node to the second node, the set up message identifying the plurality of signal types and the reserved time slots, the set up message including data that identifies a number of the multiplexing levels; and
providing the optical channel data unit label switched path between the first and second nodes,
wherein the set up message includes a bit map that identifies the reserved time slots, the bit map having bits in which the bits indicate time slots based upon the bits relative positions within the bit map.

2. The method of claim 1, wherein the network is a selected from a group consisting of a shared-mesh GMPLS network, a linear GMPLS network, a ring GMPLS network, and combinations thereof.

3. The method of claim 1, wherein the number of multiplexing levels is greater than one.

4. The method of claim 1, wherein the plurality of signals includes a first signal and a second signal, and wherein the bit map is a first bit map identifying reserved time slots for the first signal, and wherein the set up message further comprises a second bit map identifying reserved time slots for the second signal.

5. The method of claim 1, wherein the set up message identifies the reserved time slots using numbers identifying the reserved time slots.

6. An apparatus, comprising:
one or more non-transitory computer readable medium storing computer executable instructions that when executed by one or more processor cause the one or more processor to 1) reserve time slots for a plurality of types of signals to be transmitted from a first node to a second node via a network, the plurality of types of signals identify multiplexing levels within a multiplexing hierarchy of signals, 2) transmit a set up message from the first node to the second node, the set up message identifying the plurality of signal types and the reserved time slots, the set up message including data that identifies a number of the multiplexing levels and 3) provide an optical channel data unit label switched path between the first and second nodes, wherein the set up message includes a bit map that identifies the reserved time slots, the bit map having bits in which the bits indicate time slots based upon the bits relative positions within the bit map.

7. The apparatus of claim 6, wherein the network is a selected from a group consisting of a shared-mesh GMPLS network, a linear GMPLS network, a ring GMPLS network, and combinations thereof.

8. The apparatus of claim 6, wherein the number of multiplexing levels is greater than one.

9. The apparatus of claim 6, wherein the plurality of signals includes a first signal and a second signal, and wherein the bit map is a first bit map identifying reserved time slots for the first signal, and wherein the set up message further comprises a second bit map identifying reserved time slots for the second signal.

10. The apparatus of claim 6, wherein the set up message identifies the reserved time slots using numbers identifying the reserved time slots.

11. A node, comprising:
an input interface for receiving traffic from a first communication link;
an output interface for transmitting traffic to a second communication link;
a switch for communicating the traffic from the input interface to the output interface;
a control module utilizing GMPLS protocols and controlling the input interface, the output interface and the switch, the control module having circuitry to provide an optical channel data unit label switched path having more than one multiplexing level within a multiplexing hierarchy of signals, wherein the circuitry includes one or more processors of the control module programmed to generate a set up message including a multi-stage label having a number of multiplex stages field,
wherein the set up message identifies reserved time slots using a bit map in which the bits indicate time slots based upon the bits relative positions within the bit map.

12. The node of claim 11, wherein the number of multiplex stages field has an identifier greater than one.

* * * * *